Feb. 10, 1953         C. W. GUNNELS, JR         2,628,118
              HYDRAULIC SHOCK ABSORBER
Filed Aug. 28, 1946                              2 SHEETS—SHEET 1

Inventor

Charles W. Gunnels, Jr.

By Clarence A. O'Brien
and Harvey B. Jacobson
Attorneys

Feb. 10, 1953  C. W. GUNNELS, JR  2,628,118
HYDRAULIC SHOCK ABSORBER
Filed Aug. 28, 1946  2 SHEETS—SHEET 2
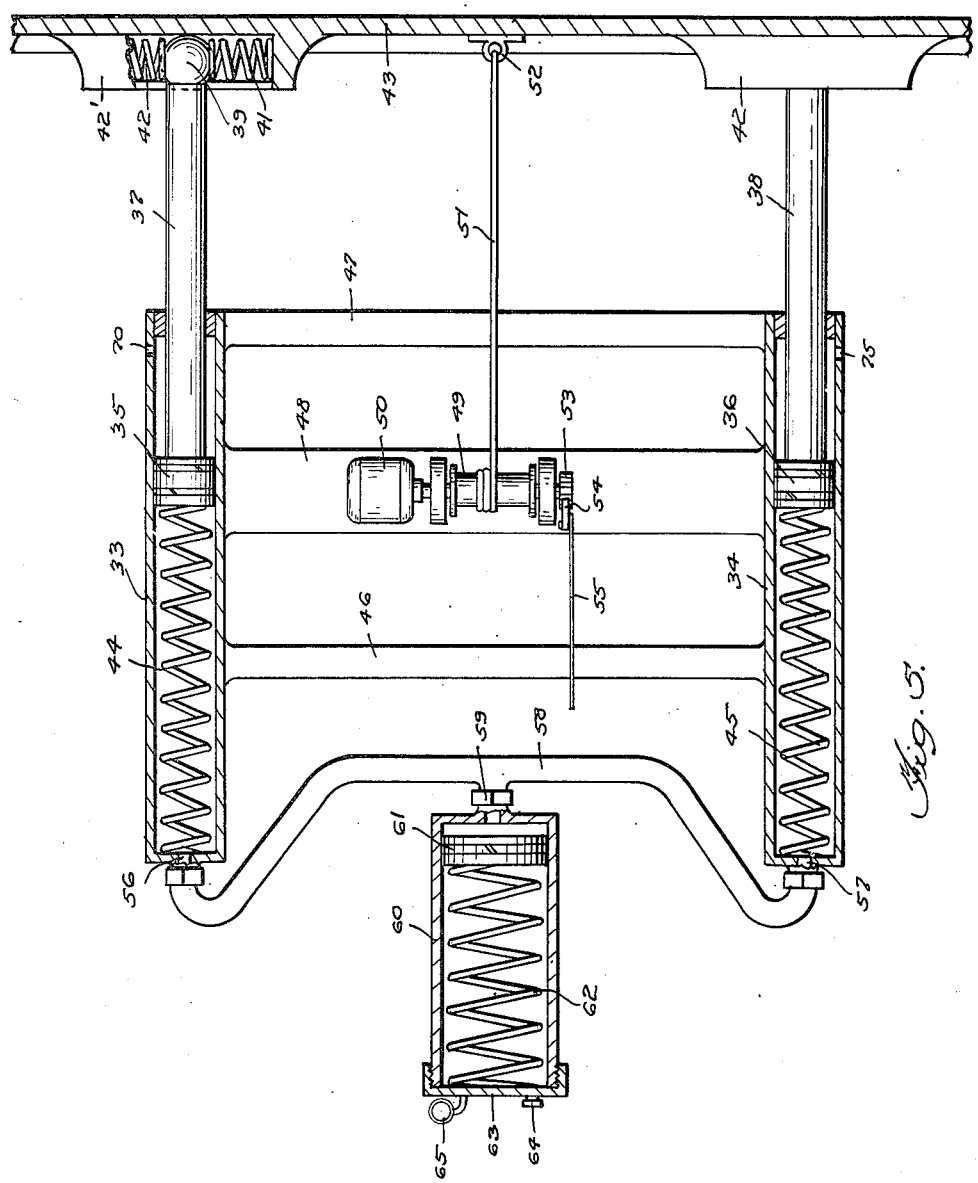
Inventor
Charles W. Gunnels, Jr.
By Clarence A. O'Brien
and Harvey B. Jacobson
Attorneys Patented Feb. 10, 1953

2,628,118

UNITED STATES PATENT OFFICE 2,628,118

HYDRAULIC SHOCK ABSORBER

Charles W. Gunnels, Jr., Quincy, Mass.

Application August 28, 1946, Serial No. 693,459

5 Claims. (Cl. 293—73)

1

This invention relates to improvements in hydraulic shock absorbers.

An object of the invention is to provide an improved hydraulic shock absorber for vehicles which will utilize the principle of forcing a hydraulic fluid through one or more restricted openings to cushion a shock when imparted to such mechanism.

Another object of the invention is to provide an improved hydraulic shock absorber for vehicles which will include cooperating pairs of hydraulic and guide cylinders in which pistons will be mounted for longitudinal movement and connected by means of suitable piston rods to a vehicle bumper.

Another object of the invention is to provide an adjustable hydraulic shock absorber for vehicles which will be connected with a vehicle bumper to extend to a predetermined distance in front of said vehicle in normal use, and said bumper having means associated therewith for retracting the same toward said vehicle to provide a lesser over-all length of the vehicle when parking space is limited or when traffic is heavy or congested.

A further object of the invention is to provide an improved hydraulic shock absorber mechanism comprising interconnected cylinders with fluid therein and pistons operable in said cylinders and connected by means of piston rods to an automobile bumper, the inner ends of said cylinders being connected to a large master cylinder for forcing the hydraulic fluid from the smaller cylinders into said large cylinder against a spring piston when force is applied to the said automobile bumper to cushion the shock.

A still further object of the invention is to provide an improved hydraulic shock absorber which will be so formed that shock absorber elements will be positioned at the opposite sides of the front of an automobile, together with means whereby if one end of the bumper is engaged or bumped, the shock absorbing means on that side of the vehicle will be adapted to cushion the shock to a greater degree than the shock absorber on the opposite side of the vehicle.

Another object of the invention is to provide an improved hydraulic shock absorber which will be highly efficient in operation, and relatively inexpensive to manufacture and produce.

Other objects will appear as the description proceeds.

In the accompanying drawings which form a part of this application,

Figure 1 is a top plan view of the preferred embodiment of the instant invention;

2

Figure 5 is a longitudinal sectional view taken through a modified form of hydraulic shock absorber utilizing two smaller shock absorber members connected with an automobile bumper, and a master shock absorber member connected with said smaller shock absorbers;

Like characters of reference are used throughout the following specification and the accompanying drawings to designate corresponding parts.

Figure 1:
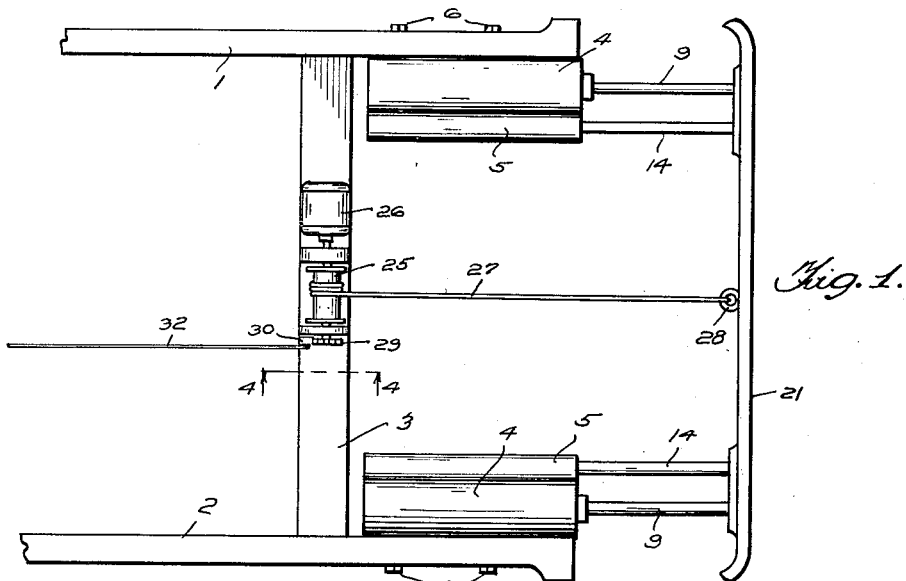
Figure 2:
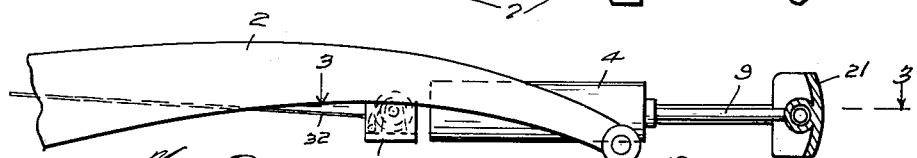
Figure 2 is a side elevation of the shock absorber shown attached to a vehicle chassis.
Figure 3:
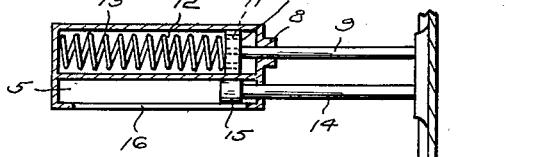
Figure 3 is a sectional view taken on the line 3—3 of Figure 2.
Figure 4:
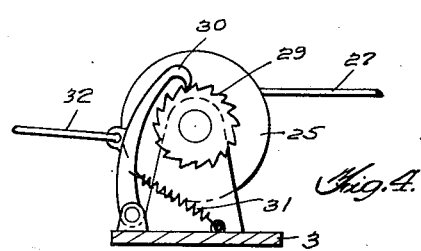
Figure 4 is a side elevation of the motor driven winch mechanism for retracting the shock absorber, as taken on the line 4—4 of Figure 1.

In carrying out the invention, there is provided a vehicle chassis having the side frame members 1 and 2, the same being connected by means of the cross frame member 3.

The combined hydraulic and guide cylinders 4 and 5 will be secured to the inner sides of each chassis side frame member 1 and 2 by means of the bolts 6 and 7.

The forward ends of the hydraulic cylinders 4 will be closed by the heads 8 which are apertured to permit the piston rods 9 to extend therethrough and into said hydraulic cylinders 4. The pistons 10 are connected or secured to the inner ends of the said piston rods 9 and are formed with the four spaced restricted ports 11 extending longitudinally through said pistons to permit the hydraulic fluid 12 to pass through said restricted openings as the piston is moved inwardly and outwardly within said hydraulic cylinders 4. If desired, longitudinally extending grooves as shown at 19 in Patent No. 1,071,586 could be formed in the inner walls of the cylinders 4 in lieu of the restricted ports 11 through the pistons 10. The coil springs 13 are mounted within the hydraulic cylinders 4 between the inner ends of the pistons 10 and the inner ends of said cylinders to normally hold or force the pistons with their piston rods forwardly to their outermost position.

The pistons 14 will extend parallel with the pistons 9 and will extend through the open ends of the guide cylinders 5, and will support the pistons 15 on their inner ends. An exhaust slot 16 will be formed throughout the length of the guide cylinder wall 5, the construction being duplicated in each of the guide cylinders.

Figures 6, 7:
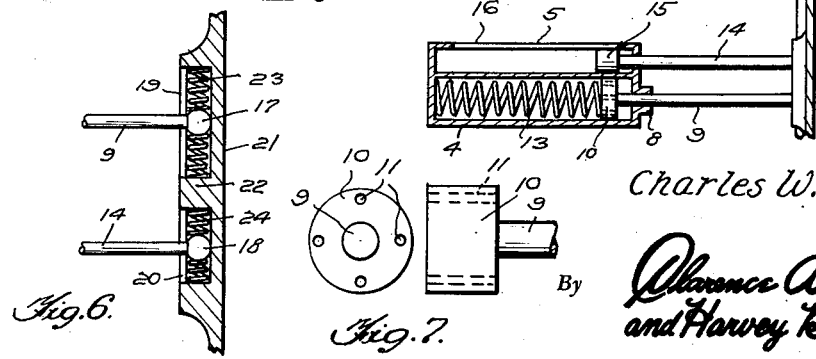
Figure 6 is a transverse sectional view showing the ball cushioning connection between the forward end of the piston rods and the automobile bumper.
Figure 7 is an exploded view showing the piston operable in the smaller shock absorber cylinders being formed with the four restricted hydraulic fluid apertures.

The forward ends of the piston rods 9 and 14 are each formed with the balls 17 and 18, to be received within the slots 19 and 20 formed in the opposite ends of the vehicle bumper 21. A central web 22 is provided to separate the slots 19 and 20, and coil springs 23 and 24 are disposed in said slots at either side of the balls 17 and 18, as clearly illustrated in Figure 6, of the drawings. The slots 20 are shorter in length and width vertically than the slots 19 to permit the guide pistons 15 and guide cylinders 5 to take the first impact of a collision to help convert side and vertical forces into a straight line thrust on the hydraulic piston rods 9 and pistons 10. The winch 25 is supported upon the cross frame 3 of the chassis, and is connected with the electric driving motor 26, and supports the steel cable 27 wound thereabout, the forward end of which is connected to the eye 28 in the rear central portion of the bumper 21, whereby when it is desired to retract the bumper 21, the electric motor 26 will be operated to operate the winch to draw in on the cable 27, thereby drawing in on the said bumper 21. The locking ratchet 29 is secured to the shaft of the winch 25, and cooperates with the pivoted dog 30, which is normally held in engagement with said ratchet teeth by means of the spring 31, and said dog being connected by means of the lever 32 extending to a point within reach of the driver of the vehicle, whereby the lever or rod 31 may be pulled upon to disengage the dog 30 from the ratchet 29 to permit the bumper 21 to be forced outwardly to its normal position by means of the coil springs 13 in the hydraulic cylinders 4.

In Figure 5 of the drawings, there is illustrated a modified form of hydraulic shock absorber and comprises the spaced forwardly extending cylinders 33 and 34 in which the pistons 35 and 36 are respectively positioned for longitudinal movement, and are connected by means of the piston rods 37 and 38, which formed with the balls 39 on their forward ends. Vents 70 and 75 are formed through the walls of the cylinders 33 and 34 at their extreme forward ends. The balls 39 are adapted to be engaged by the opposed springs 41 and 42 received within the slotted keepers 42 in the bumper 43. The coil springs 44 and 45 will be disposed in the cylinders 33 and 34 between the inner ends of said pistons 35 and 36 and the inner ends of the said cylinders to normally force the pistons with the interconnected piston rods and bumper to its forwardmost position.

The cross brace members 46 and 47 are connected between the hydraulic cylinders 33 and 34 to reinforce and position the same, and an intermediate frame member 48 is connected between the two hydraulic cylinders 33 and 34, and supports the winch 49 and its electric driving motor 50. A steel cable 51 is wound about the winch 49 and connects with an eye 52 on the bumper 43. The locking ratchet 53 is secured to the winch shaft and a locking dog 54 is normally held in engagement therewith, but is adapted to be disengaged when the rod or cable 55 extending to a point within reach of the vehicle driver, is pulled.

The inner ends of the hydraulic cylinders 33 are provided with the apertures restricted 56 and 57, which connect with the tubing 58 which is connected at a central point 59 to the forward end of a master cylinder 60. The cylinder 60 is provided with the piston 61 freely movable therein, while a coil tensioning spring 62 is disposed in the outer end of the cylinder 60 between said piston 61 and the head 63 of the cylinder.

A closure or filling plug 64 is provided in the end of the cylinder 60 for charging the lower end thereof with compressed air. A suitable pressure gauge 65 is also connected with the closed head 63 of said master cylinder 60.

When pressure is applied to the bumper 43, the piston rods and pistons will be forced inwardly within the hydraulic cylinders 33 and 34 thereby forcing the hydraulic fluid in said cylinders out through the restricted lower ends or inner ends and through the pipes 58 into the forward end of the cylinder 60, to force the piston 61 inwardly in said cylinder to further compress the compressed air in the lower end of the said cylinder 60 and against the action of the coil spring 62 in the lower end of said cylinder 60 disposed between the inner end of the piston 61 and the closed end or head 63 of said cylinder. It will therefore be seen that the action of the coil springs 44, 45 and 62 will be to force the pistons within the various cylinders to their forwardmost position to force said bumper to its forwardmost position.

As in the preferred embodiment of the invention, the motor 50 will operate the winch 49 to draw in on the cable 51 to retract the bumper 43 when it is desired to have the shortest over-all length of the vehicle possible for parking purposes and otherwise.

From the foregoing description, it will be apparent that there has been devised and provided a highly efficient form of hydraulic shock absorber which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination, a vehicle having a bumper and hydraulic shock absorber units associated therewith, said shock absorber units each comprising parallel hydraulic and guide cylinders which are connected together at confronting side walls along their entire lengths, pistons therein, piston rods between said pistons and bumper, a cushioning spring for said piston in said hydraulic cylinder, said piston in the hydraulic cylinder being formed with longitudinally extending restricted bypass ports, and said guide cylinders being ported through their side walls.

2. The subject matter as claimed in Claim 1, and means for retracting said bumper towards said vehicle.

3. The subject matter as claimed in claim 1, and means for retracting said bumper toward said vehicle, said means including a motor driven winch connected to said bumper by means of a cable.

4. The subject matter as claimed in claim 1, means for retracting said bumper toward said vehicle, said means including a motor driven winch connected with said bumper by means of a cable, and remotely controlled cable releasing locking dog for holding said winch in the desired adjusted position.

5. The subject matter as claimed in claim 1, and resilient connections between said piston rods and bumper.

CHARLES W. GUNNELS, Jr.

REFERENCES CITED

The following references are of record in the file of this patent:

UNITED STATES PATENTS

| Number | Name | Date |
|---|---|---|
| 908,561 | Graf | Jan. 5, 1909 |
| 1,071,586 | Rowan | Aug. 26, 1913 |
| 1,459,365 | Dains | June 19, 1923 |
| 1,530,017 | Souliotis | Mar. 17, 1925 |
| 1,548,087 | Heller | Aug. 4, 1925 |
| 1,646,055 | Ebaugh | Oct. 18, 1927 |
| 1,655,973 | Vella | Jan. 10, 1928 |
| 1,664,989 | Nickels | Apr. 3, 1928 |
| 1,755,007 | Jackson | Apr. 15, 1930 |
| 2,001,093 | Cherpes et al. | May 14, 1935 |
| 2,048,945 | Pascheka | July 28, 1936 |
| 2,090,659 | Zirmer | Aug. 24, 1937 |
| 2,170,981 | Walter | Aug. 29, 1939 |